June 17, 1958 R. P. GARRISON ET AL 2,839,307
CENTRIFUGAL CHUCK
Filed Nov. 3, 1953

INVENTORS
RALPH P. GARRISON
JAMES O. GARRISON
DAVID D. WALKER
BY
Tom Walker

United States Patent Office 2,839,307
Patented June 17, 1958

2,839,307
CENTRIFUGAL CHUCK

Ralph P. Garrison, James O. Garrison, and David D. Walker, Dayton, Ohio, assignors to Garrison Machine Works, Inc., Dayton, Ohio, a corporation of Ohio Application November 3, 1953, Serial No. 389,946

10 Claims. (Cl. 279—1)

This invention relates to chucks for holding a work piece while various machining operations are performed thereon, such as boring, grinding, facing and the like. Although not so limited, the invention has especial application to a chuck for holding a gear blank for the performing of a facing operation thereon.

The object of the invention is to simplify the construction as well as the means and mode of operation of chucks whereby such chucks may not only be economically manufactured, but will be more efficient and satisfactory in use, adaptable to a wide variety of work pieces, having relatively few parts, and being unlikely to get out of repair.

An object of the invention is to provide a quick operating chuck of especial utility in installations where manual, air hydraulic or other means of opening and closing the chuck are not available or are undesirable.

Another object of the invention is to make the chuck self-opening and self-closing in response to the stopping and the starting of rotary motion thereof.

A further object of the invention is to obviate the use of springs or like tensioning devices in effecting the opening and closing movements of the chuck.

A still further object of the invention is to provide a chuck of especial utility in the holding of gear blanks but adaptable without modification in the construction and mode of operation thereof to the gripping and centering of work pieces other than gear blanks.

Still another object of the invention is to provide a gear chuck which is readily adjustable to accommodate gears of different diameters and which has an open planar surface readily accessible for the making of such adjustments.

A further object of the invention is to provide a chuck possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Figure 1:
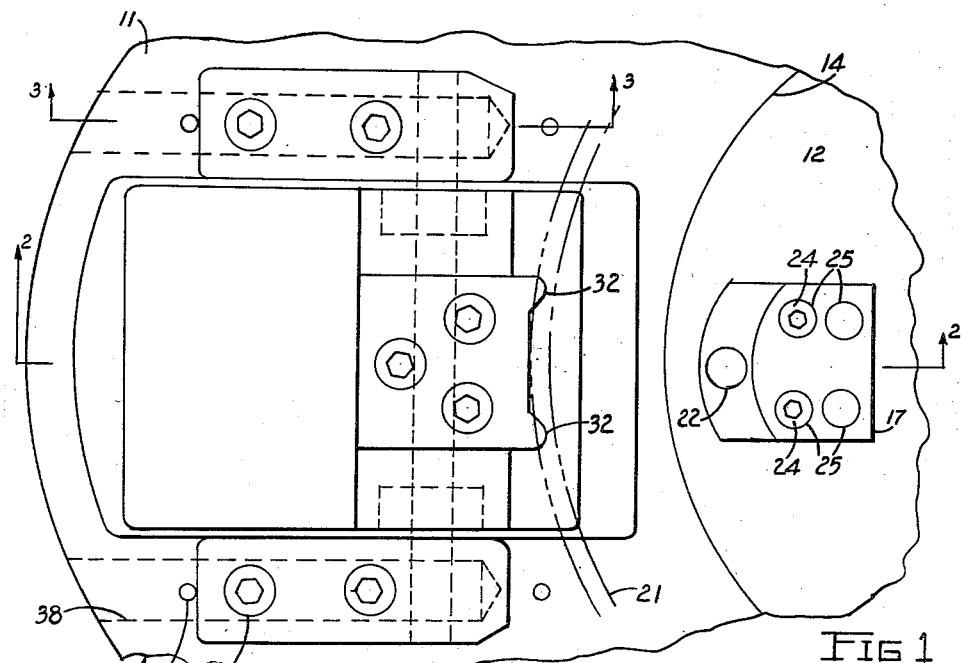
Figure 2:
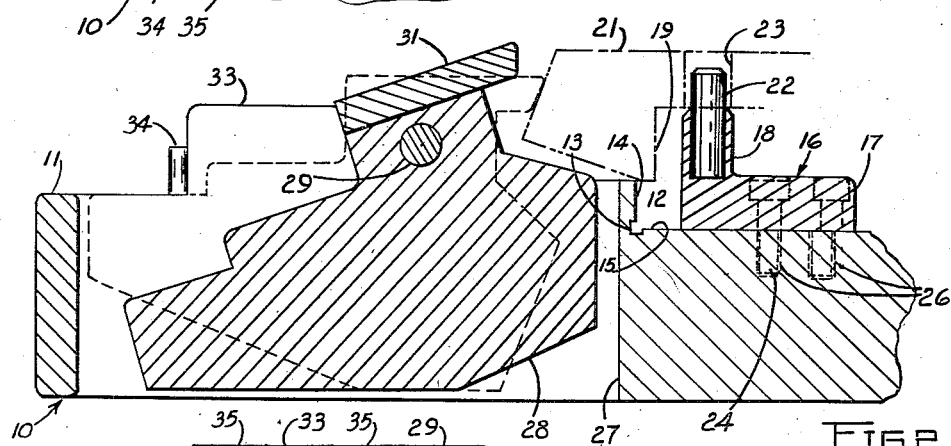
Figure 3:
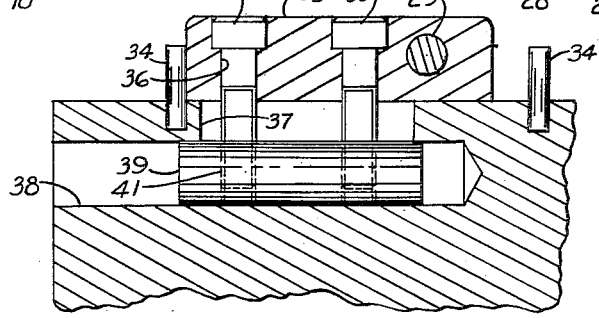

Referring to the drawing, wherein is shown one, but obviously not necessarily the only form of embodiment of the invention, Fig. 1 is a fragmentary view in top plan of a chuck in accordance with the illustrated embodiment of the invention;

Fig. 2 is a view in cross section taken substantially along the line 2—2 of Fig. 1; and Fig. 3 is a view in cross section taken substantially along the line 3—3 of Fig. 1.

Like parts are indicated by similar characters of reference throughout the several views.

Referring to the drawings, a chuck in accordance with the illustrated embodiment of the invention includes a body 10, made relatively flat and disc-shaped and constructed for rotation about its central axis. One side face of the body 10 presents a flat planar surface 11 at right angles to the longitudinal axis of the body. In the surface 11 is a central bore 12, concentric with the longitudinal axis of the body 10. This bore is undercut at 13 to define two surfaces 14 and 15 which are accurately finished relatively to one another and to the longitudinal axis of the body 10. Any type of locating device may therefore be installed in the planar surface 11 or substituted therein, for the purpose of holding different kinds of work pieces concentric with the longitudinal axis of the body 10.

In the present instance, and since the invention is disclosed as adapted for holding bevel gear blanks, the work piece supporting means is seen to comprise a circular series (one shown) of supports 16 resting on the land 15. Each support 16 consists essentially of a block 17 and an integral upstanding shoulder 18, the latter being curved so that it may conform approximately to the curvature of the bore 19 of the gear blank 21 which is indicated in dotted lines as installed in the chuck. The gear blank 21 rests on the shoulders 18, at least one of which has a projecting pin 22 set therein. The pin 22 is adapted to enter an opening 23 in the gear blank 21 and is useful in a quick locating of the gear blank in approximately concentric position and in causing the blank to rotate with the body 10 during the initial phase of rotation thereof.

The supports 16 are attached to the body 10 by means of bolts 24 which pass through openings 25 in the block portion 17, and into tapped recesses 26 in the land 15. As noted, there are two sets of openings 25 and the bolts 24 are installed alternatively in such sets of openings. There are two sets of recesses 26, spaced apart a distance corresponding to the amount of adjustment desired in the support 16, it being understood that the use of plural openings 25 is provided for the same purpose, that is, to enable the several supports 16 to be adjusted in a radial sense to accommodate gear blanks of different diameters. In the present instance, the recesses 26 are provided in such number and in such spacing as to enable two different locating positions of adjustment of the supports 16, as for example to support eight and one quarter inch diameter gears in one position and to support eight and three quarter inch diameter gears in the other position.

Outwardly of the surface 14, and the supports 16, in the body 10, is a circular series of longitudinal through openings 27 (one shown) occupying respective radial positions with respect to the longitudinal axis of the body. Each recess 27 receives a weighted arm 28 eccentrically mounted on a stub shaft 29 in such way that the arm tends to rock by gravity in a counterclockwise direction as viewed in Fig. 2. Each arm 28 has a finger 31 in the form of a plate detachably fastened to the arm 28 for engagement with the peripheral edge of the blank 21, the arm 28 and finger 31 co-operating to define a clamp jaw. One side edge of the finger or plate 31 faces the longitudinal axis of the body 10 and is formed with spaced apart protruding portions 32 which directly contact the work piece and which make possible a positive gripping engagement with the work irrespective of irregularities in the surface thereof.

It will be apparent that the several clamp jaws are arranged for rocking motion in respective radial planes in order cooperatively to grip and to hold the work piece. It further will be apparent that rocking motion of the clamp jaws is centrifugally induced, the jaws rocking in a clockwise direction in response to rotation of the body to grip the work and rocking in a counterclockwise direction under gravity influence, as rotation of the body is discontinued, to release the work. The conjoint movement of the clamp jaws to grip and to release the work are the closing and opening movements of the chuck and it will be understood that these are effected without the aid of springs or other mechanical or manual devices.

Each stub shaft 29 extends through and beyond the sides of its respective clamp jaw arm 28, the opposite ends of such shaft being received, in bearing blocks 33 which rest on the planar surface 11 in flanking or embracing relation to the clamp jaw. The bearing blocks 33 are adjustable in a radial sense between opposed limits as defined by opposed pairs of pins 34. In so moving the bearing blocks 33 the clamp jaws are correspondingly moved in an approaching or withdrawing direction relatively to the longitudinal axis of the body 10, it being understood that the purpose of such adjustment is to allow the clamp jaws to engage the work as a result of substantially the same amount of rocking motion of the jaws irrespective of the diameter of the work pieces. Further, it will be understood that the spacing between the pins 34 is related to the spacing between the tapped recesses 26, the illustrated arrangement of parts being such as to give the clamp jaws alternative positions of adjustment to accommodate either an eight and one quarter inch gear blank or an eight and three quarter inch gear blank. It will be evident that other adjustments of the bearing blocks 33 could be effected by providing additional holes in the surface 11 to receive the pins 34 and a further flexibility may be achieved in the chuck assembly by substituting shorter or longer clamp fingers 31 so that the work piece is engaged at an earlier or later point in the centrifugally induced movement of the clamp jaws.

The bearing blocks 33 are releasably locked in adjusted position by means including a pair of bolts 35. As shown in Fig. 3, the bolts 35 pass through openings 36 in each block 33 and through a slot 37 which communicates the surface 11 with a bore 38 opening through the peripheral edge of the body 10. It will be understood that there is a circumferential series of the bores 38, one for each bearing block 33. Slidably mounted in each bore 38 is a so-called "Zipnut" 39 which is a section of a round shaft having spaced apart tapped recesses 41 in line with one another and opening through the side of the shaft. The inner ends of the bolts 35 are threaded and are received in the tapped recesses 41. It will be apparent that by screwing the bolts 35 downward into the openings 36 a reactant force is set up urging the nut 39 upward into frictional engagement with the upper surface of the bore 38 and urging the block 33 downward into tight frictional engagement with the surface 11. With the application of adequate torque to the bolts 35 it will be understood that sufficient frictional resistance to movement can be developed to hold the bearing block 33 firmly seated on the surface 11. By turning the bolts 35 in the opposite direction, the relative clamping pressure applied between the nut 39 and the bearing block 33 is released and the block can be moved radially to a new position of adjustment. The slot 37 is, of course, made long enough to permit the bearing block 33 to be moved throughout the full range of adjustment which has been provided for it.

In Fig. 2 of the drawings, the clamp has been shown in its alternate blank gripping and releasing positions. Thus, the jaw normally occupies substantially the position shown in full lines and the chuck is at this time open for loading or unloading of the work piece. In response to rotation of the chuck body, the chuck jaw rocks to the position shown in dotted lines wherein it engages the peripheral edge of the blank or work piece 21. During continued rotation of the chuck body the blank 21 accordingly rotates therewith. When rotary motion of the chuck body is stopped, the clamp jaws drop by gravity, returning to the full line position illustrated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A chuck, including a rotary body having a central axis, means for locating a work piece in concentric relation to said body, a series of centrifugally responsive clamp jaws carried by said body and movable in planes radial to the axis of said body to engage and disengage the peripheral edge of the work piece and radially adjustable mounts for said clamp jaws.

2. A chuck including a rotary body, means for supporting a work piece on said body in concentric relation thereto, and a plurality of centrifugally and gravity responsive clamp jaws carried by said body for movement in planes radial to the longitudinal axis of said body engageable with the peripheral edge of the work piece.

3. A chuck including a rotary body, radially adjustable means for supporting a work piece on said body in concentric relation thereto, and a plurality of radially adjustable centrifugally responsive clamp jaws carried by said body radially outward of said means engageable with the peripheral edge of the work piece in response to rotation of the body and withdrawing by gravity from engagement with the work piece upon discontinuing of rotation of the body.

4. A chuck, including a body constructed for rotation about its central axis, a planar surface on said body at right angles to said longitudinal axis, recesses in said surface in respective planes radial of said longitudinal axis, weighted clamp jaws received in said recesses and eccentrically mounted on said body for centrifugal and gravity responsive rocking motion toward and from the said longitudinal axis of said body, and means set in said surface radially inward of said clamp jaws for supporting a gear blank or the like with its peripheral edge in position to be engaged by said clamp jaws.

5. A chuck according to claim 4, characterized in that said last named means includes a circumferential series of supporting members radially adjustable to accommodate gear blanks of different diameter.

6. A chuck, including a body constructed for rotation about its central axis, a planar surface on said body at right angles to said longitudinal axis, a circular series of supports on said surface in concentric relation to said axis, means for adjusting said supports radially of said axis, a circular series of centrifugally acting clamp jaws outwardly of said supports, a mounting on said body for each of said jaws, and means for adjusting said mountings radially of said axis.

7. A chuck, including a body constructed for rotation about its central axis, a planar surface on said body at right angles to said axis, means for supporting a gear blank or the like on said surface in concentric relation to said axis, eccentrically weighted clamp jaws disposed in respective radial planes outwardly of said supporting means, a pivot stud for each of said jaws supporting said jaws for oscillatory motion in said radial planes and bearing blocks for said pivot studs mounted on said planar surface in adjacent parallel relation to said clamp jaws.

8. A chuck according to claim 7, characterized by means for adjusting said bearing blocks in a radial sense relatively to said planar surface.

9. A chuck, including a disc shaped body constructed for rotation about its central axis, one side face of said body presenting a planar surface at right angles to said axis, a circular series of bearing blocks mounted on said planar surface, pivot studs journaled in adjacent pairs of said blocks, an eccentrically weighted clamp jaw rotatably mounted on each of said pivot studs, and means for supporting a work piece in concentric relation to said axis and to said jaws, said jaws rocking in one direction in response to rotation of said body to grip said work piece and rocking in the opposite direction in response to gravity upon the stopping of the rotation of said body to release said work piece.

10. A chuck according to claim 9, characterized by means for releasably locking said bearing blocks in selected radial positions of adjustments, said means including radial recesses in said body beneath said planar surface, nuts received in said recesses and bolts passing through said bearing blocks and extending through said surface into threaded engagement with said nuts.

References Cited in the file of this patent

UNITED STATES PATENTS

| | | |
|---|---|---|
| 1,263,081 | Letzing | Apr. 16, 1918 |
| 1,470,158 | Garrison | Oct. 9, 1923 |
| 1,864,191 | Eidam | June 21, 1932 |
| 2,207,621 | Hite | July 9, 1940 |
| 2,443,895 | Day et al. | June 22, 1948 |
| 2,450,970 | Lance et al. | Oct. 12, 1948 |
| 2,535,199 | Day | Dec. 26, 1950 |